US011865807B2

(12) United States Patent
Schalk et al.

(10) Patent No.: US 11,865,807 B2
(45) Date of Patent: Jan. 9, 2024

(54) PACKAGING STATION FOR PRODUCING CUSHIONING MATERIAL

(71) Applicant: Sprick GmbH Bielefelder Papier—und Wellpappenwerke & Co., Bielefeld (DE)

(72) Inventors: Bastian Schalk, Detmold (DE); Oliver Schmidt, Meensen (DE)

(73) Assignee: Sprick GmbH Bielefelder Papier-Und Wellpappenwerke & Co., Bielefeld (DE)

( * ) Notice: Subject to any disclaimer, the term of this patent is extended or adjusted under 35 U.S.C. 154(b) by 302 days.

(21) Appl. No.: 15/746,953

(22) PCT Filed: Jul. 22, 2016

(86) PCT No.: PCT/EP2016/067511
§ 371 (c)(1),
(2) Date: Jan. 23, 2018

(87) PCT Pub. No.: WO2017/017006
PCT Pub. Date: Feb. 2, 2017

(65) Prior Publication Data

US 2020/0086599 A1 Mar. 19, 2020

(30) Foreign Application Priority Data

Jul. 24, 2015 (DE) ........................ 102015009653.2

(51) Int. Cl.
*B31D 5/00* (2017.01)

(52) U.S. Cl.
CPC .... *B31D 5/0056* (2013.01); *B31D 2205/0023* (2013.01); *B31D 2205/0035* (2013.01); *B31D 2205/0047* (2013.01)

(58) Field of Classification Search
CPC .......... B31D 5/0056; B31D 2205/0023; B31D 2205/0035; B31D 2205/0047; B65D 5/38; B65D 5/723; B65D 5/728
(Continued)

(56) References Cited

U.S. PATENT DOCUMENTS 2,882,802 A * 4/1959 Walker ...................... B31F 1/08 493/45
3,509,797 A * 5/1970 Johnson ............... B31D 5/0047 493/340
(Continued)

FOREIGN PATENT DOCUMENTS

DE 69213852 T2 1/1997
DE 10030215 A1 1/2002
(Continued)

OTHER PUBLICATIONS

Sprick GmbH Bielefelder Papier- und Wellpappenwerke & Co., International Patent Application No. PCT/EP2016/067511, International Search Report and Written Opinion, dated Oct. 11, 2016.
(Continued)

*Primary Examiner* — Joshua G Kotis
*Assistant Examiner* — Scott A Howell
(74) *Attorney, Agent, or Firm* — Banner & Witcoff Ltd.

(57) ABSTRACT

A packaging station comprising a deformation device for converting a web of packaging material drawn from a supply of packaging material web, such as a leporello folded stacked web, into a dunnage material and a conveyor structure for receiving the drawn web of packaging material and for feeding the drawn web of packaging material into the deformation device, wherein the conveyor structure comprises a conveyor track extending from a reception of the conveyor structure to the deformation device and being dimensioned such that, after passing the reception, the web
(Continued)

Figure 1:
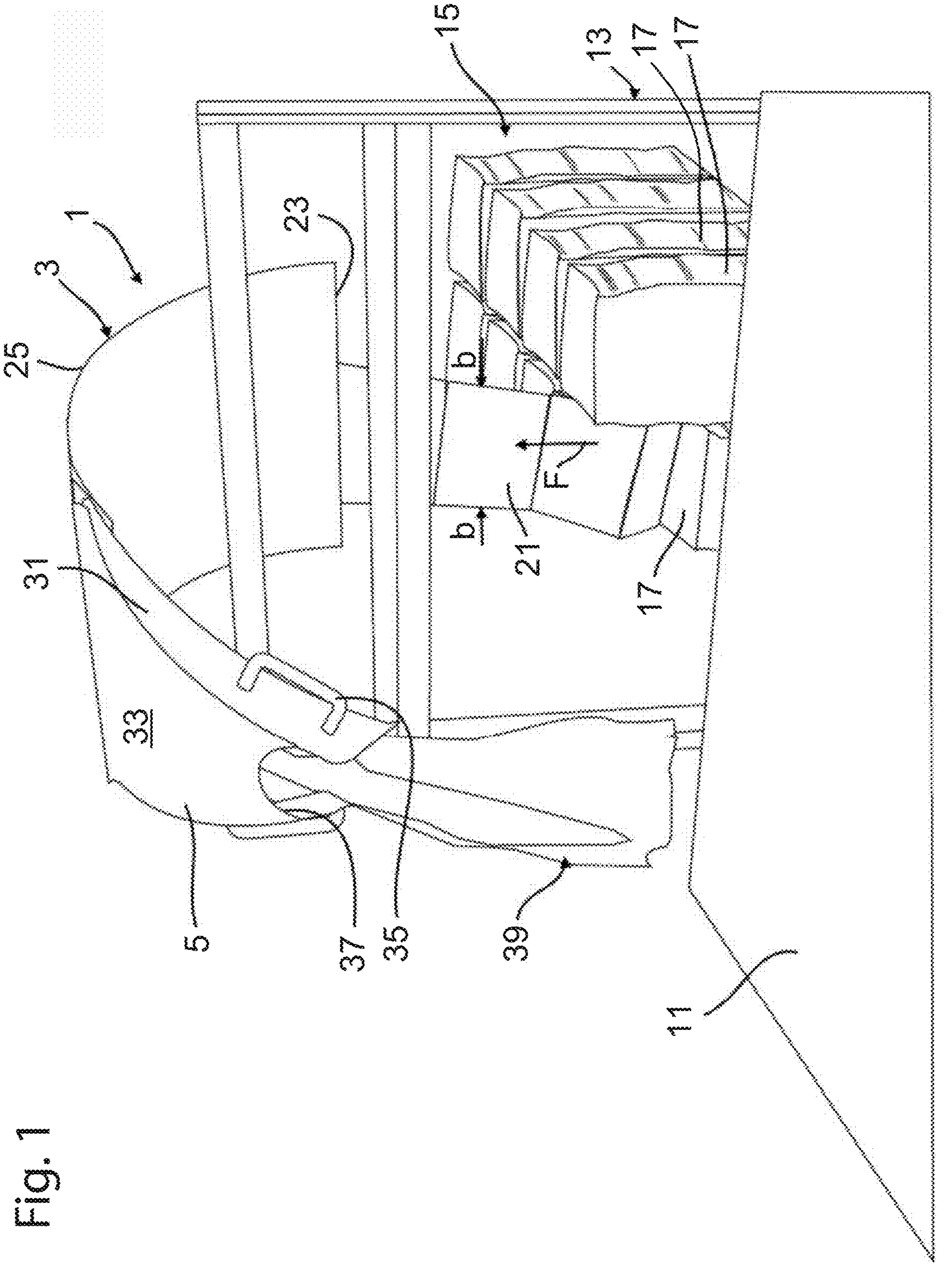

of packaging material is able to bear over its entire surface on the conveyor track in the conveying direction for at least the twofold of the width of the web.

17 Claims, 4 Drawing Sheets

(58) Field of Classification Search
USPC .......................................................... 493/407
See application file for complete search history.

(56) References Cited

U.S. PATENT DOCUMENTS

| | | | | | |
|---|---|---|---|---|---|
| 3,799,039 | A * | 3/1974 | Johnson | B31D 5/0047 493/357 |
| 4,884,999 | A | 12/1989 | Baldacci | |
| 5,813,967 | A * | 9/1998 | Davila | B31D 5/0047 493/464 |
| 6,076,764 | A * | 6/2000 | Robinson | B26D 7/24 242/571.5 |
| 6,190,299 | B1 * | 2/2001 | Simmons | B31F 1/10 493/464 |
| 6,210,310 | B1 * | 4/2001 | Manley | B31D 5/0047 493/464 |
| 7,186,208 | B2 * | 3/2007 | Demers | B26F 3/02 493/350 |
| 7,585,268 | B2 * | 9/2009 | Cheich | B31D 5/0043 206/233 |
| 2008/0125300 | A1 * | 5/2008 | Cheich | B65D 83/0805 493/464 |
| 2011/0053751 | A1 | 3/2011 | Arora et al. | |
| 2015/0119224 | A1 | 4/2015 | Orsini et al. | |

FOREIGN PATENT DOCUMENTS

| | | | |
|---|---|---|---|
| DE | 102008030916 | A1 | 1/2010 |
| FR | 2808726 | A1 | 11/2001 |
| GB | 2501260 | A | 10/2013 |

OTHER PUBLICATIONS

Sprick GmbH Bielefelder Papier- und Wellpappenwerke & Co., International Patent Application No. PCT/EP2016/067511, International Preliminary Report on Patentability, dated Feb. 8, 2018.

Sprick GmbH Bielefelder Papier- und Wellpappenwerke & Co., German Patent Application No. 102015009653.2, Office Action, dated Feb. 5, 2016.

* cited by examiner

PACKAGING STATION FOR PRODUCING CUSHIONING MATERIAL

The invention relates to a packaging station comprising a deformation device for converting a web of packaging material drawn from a supply of packaging material web, such as a leporello folded stacked web, into a dunnage material, and a conveyor structure for receiving the drawn web of packaging material and for feeding the drawn web of packaging material into the deformation device. The packaging material is preferably paper, in particular waste paper.

The invention is concerned in general with conveying a packaging material web, which is made available in a supply state, generally rolled up or in a leporello folded stack, free of damage into a deformation device, in which the packaging material web is deformed into dunnage material, which is used for filling into transportation void spaces, for example in mail order trading. Owing to its adaptable packing volume, the paper web is being used, with easy storage, increasingly frequently and preferredly in mail order trading. The objects which are to be dispatched, which are posted in transport containers or cardboard boxes, are cushioned with the dunnage material. A packaging station is to be set up at the site of the dispatch centre and is to be provided with a sufficiently large supply of packaging material. Generally, it is advantageous to provide the packaging material as fast as possible and in as little a complicated a manner as possible for the person responsible for packaging, so that an effective and operator-friendly packaging is made possible.

Deformation devices with manual drive and with motorized drive are known. An established packaging machine with motorized operation is known from DE 10 2005 053 319 A1, according to which a paper roll is inserted into a funnel-shaped reception. For this, an operator must lift the suitable paper roll and insert it from above into the funnel-shaped reception. The deformation device is arranged immediately following the funnel-shaped reception. The paper web is drawn from the inner side of the paper web roll and is deformed into the dunnage material by a pair of deforming gears. Owing to drawing the paper web from the inside of the paper web roll, whereby a spiral-shaped paper web shape is formed, a relatively stable paper web, irrespective of the used condition of the paper web roll, is fed to the deformation device. A similar packaging machine, but with manual operation, is known from DE 20 2012 009 025 U1, in which a paper web roll is likewise inserted into a funnel-shaped reception. The packaging material is drawn from the inner side of the web material roll, whereby a spiral-shaped packaging material is created. The spiral-shaped intermediate packaging product is intrinsically stable and can bridge the way to the deformation device in a reliable and relatively damage-free manner.

A further packaging material work station is known from WO 2005/007394 A1, in which a packaging station comprises a deformation device and a leporello folded stack supply. The deformation device has a stand, on which a leporello folded stack holder, which is L-shaped in cross-section, is fastened. The unfolded leporello web is introduced into a feed opening of the deformation device via a deflection idler roller, which involves a deflection of the web of over 180°. Between the deflection idler roller and the feed opening of the deformation device, the "two-dimensional" leporello web remains unmanipulated, i.e. in this region there is no conveying guidance for the leporello web. A pair of deformation wheels, which produces the dunnage packaging material, is arranged in the interior of the deformation device.

In order to increase the amount of packaging material to a packaging material work station, it is known to provide a plurality of leporello folded stacks over one another in a magazine, which is known for example from WO 2012/067987 A2. The magazine surrounds the leporello folded stacks in a box-shaped manner and is arranged on a carriage, which also carries a stand for holding the deformation device. The leporello material web, unfolded from the magazine, is fed directly to a motorized deformation device. At the output of the magazine a deflection roller is provided, which aligns the leporello web towards the insert opening of the motorized deformation device. The paper web is conveyed from the deflection roller towards the deformation device without guidance.

Furthermore, from EP 0 730 525 B1 a packing table is known, with a machine for producing dunnage material, in which the packaging material is unrolled from a rotatably mounted storage roller, from the outer side thereof, which packaging material is fed to a deformation device via a plurality of deflection rollers.

A need exists to increase the packaging speed, without impairing the quality of the dunnage material or the ergonomic work station conditions for the operator at the packaging station. The packaging station is also to be equipped with such a large supply of packaging material that a logistic supplying of the packaging station with packaging material is has to be performed only after lengthy periods of time. At least a packaging material is to be provided for a period of at least one day. With the use of leporello folded stacks of the packaging material web, a particularly suitable, space-saving storage system is provided, wherein the unfolding and the reliable feeding of packaging material into the feed device allows high forces to act on the unfolded packaging material web. The speed of drawing of the packaging material from the supply could not be readily increased, especially in case recycled paper is used as packaging material, which tends rather more to tearing than other packaging material. Also, a frequent switching on and off, therefore a jerky accelerating of the material web, can lead to the packaging material being damaged, whereby the packaging production process must be stopped and, if need be, the packaging material web must be fed again into the deformation device.

It is an object of the invention to overcome the disadvantages of the prior art, in particular to improve a packaging station to the effect that the speed in the production of dunnage material is increased, at the same time a starting and ending of the web material deformation is realized in as reliable and damage-free manner as possible for the packaging material.

This problem is solved by the features of Claim 1.

Accordingly, a packaging station is to be provided, which comprises a deformation device for converting the web of packaging material drawn from the supply of packaging material web, such as the leporello folded stacked web, into a dunnage material, and a conveyor structure for receiving the drawn web of packaging material and for feeding the drawn web of packaging material into the deformation device. The deformation device can be operated manually or can be motorized. Preferably, a manual deformation device is provided, a deformation device suitable for the invention being explained later in detail. The conveyor structure comprises a conveyor track which, in particular after the drawing of the web of packaging material from the supply of the packaging material, in particular after the unfolding of the leporello folded stack web, receives the web of packaging material and escorts it towards the conveyor structure, preferably by resting the web of packaging material in a flat manner on the conveyor track. According to the invention, the conveyor track extends from a reception of the conveyor structure, which in particular is to be understood as the first flat reception point, after the web of packaging material has been drawn from the supply. The drawn web of packaging material is formed, for example in the case of a leporello folded stack, as soon as the web of packaging material is unfolded or, in the case of a paper web roll, as soon as the web of packaging material is unwound flat from the exterior of the paper web roll. It shall be clear that the preferred packaging material is paper, in particular recycled paper. Furthermore, the conveyor track can have a minimum length up to the deformation device, which corresponds to at least twice the width of the material web, preferably three or four times the width of the material web, so that the material web, before it discharges into the deformation device, can be conveyed in a sufficiently stable and smooth manner for the deformation process. The inventors found that a conveyor track, in contrast to the directing of the web of material by deflection rollers to the deformation device, provides a stabilizing guiding effect, for which reason even recycled paper which tends to tear, can be acted upon at high speeds and with high acceleration forces in order to convey the web of packaging material to the deformation device. By the guidance support over the entire surface along the conveyor track, assisted by the formation of air cushions and air layers or respectively air underpressure zones between the web of packaging material and the sliding support of the conveyor track, the desired “adhesion effect” and smoothing of the guidance of the web of packaging material in particular immediately before entry into the deformation device is achieved. The air layer which can form between the web of packaging material and the conveyor track can also bring it about that the web of packaging material does not undergo a constant and continuous direct contact with the conveyor track over the entire surface thereof, in particular when travelling at higher conveying speeds, however, it was found that just the dynamic pressure conditions in the air layer between the web of packaging material and the conveyor track implicate a stabilizing guidance and prevents air turbulences, which can be generated by conveying the web of packaging material itself or by extraneous movement.

In a preferred embodiment of the invention, the conveyor track is formed by a sheet or by a mesh, particularly having a plane, preferably concavely-planar, sliding support facing the web of packaging material, particularly a sliding surface. A conveyor track which is configured in such a manner proved to be particularly advantageous in preventing intrusive external influences during the conveying of the web of packaging material, in particular at higher speeds and with greater acceleration forces. Preferably, the sliding support is shaped in a concavely curved manner, wherein in particular the reception of the conveyor track is formed by an essentially rectilinear edge extending essentially perpendicular with respect to the conveying direction. The arrangement of the conveyor track with regard to the influence of gravity is not insignificant, which assists here in pressing the web of packaging material onto the conveyor track.

In a preferred embodiment of the invention, no further mechanical or structural devices are to be provided along the conveyor track towards the deformation device, in order to direct steering or directing forces onto the web of packaging material during conveying in the conveying direction along the conveyor track. Only gravity and the traction conveying force, which draws the packaging material from the packaging material supply in the conveying direction, are preferably to be the sole operating forces which act on the web of packaging material, in particular as soon as it moves along the conveyor track in the conveying direction. A type of fallback stopper is to serve as an exception, which, in the manner of a non-return valve, prevents the web of packaging material from falling back to the packaging material supply contrary to the conveying direction, in case the operator has torn off the dunnage material at the disposal end of the deformation device. In case of using motorized deformation devices, such a fallback stopper is obsolete.

In a preferred embodiment of the invention, the reception of the conveyor track is formed by an essentially rectilinear edge extending essentially perpendicular with respect to the conveying direction. In so doing, it is ensured that the web of packaging material arrives reliably onto the conveyor track, without major friction forces acting on the web of packaging material on entry into the conveyor track. The rectilinear edge can be, for example, flanged, or bent around in another manner, in order to prevent damage to the web of packaging material.

Preferably, no lateral boundary walls are provided along the sheet-shaped conveyor track; the sheet-like conveyor track terminates at the sheet edge extending in the conveying direction, without vertically projecting edge sections being arranged there.

In a preferred embodiment of the invention, a plane, preferably concavely-planar, sliding support of the conveyor track comprises a sliding support width of at least one width or one and a half widths of the web of packaging material and/or the sliding support comprises a sliding support length of at least two or three widths of the web. It was found that this minimum length is sufficient to calm the web of packaging material, in particular at high conveying speeds after the turbulence of drawing, in particular unfolding, from the packaging material supply, so that a positionally accurate, stable conveying of the web of packaging material from the conveyor track into the deformation device occurs.

In a further development of the invention, the conveyor track comprises the form of a bridge arc connecting the supply of packaging material web with the deformation device. The conveyor track, having the form of a bridge arc, is embodied in a concavely planar or smooth manner on the sliding support, which faces the web of packaging material, so that the sliding friction of the web of packaging material on the sliding support is as little as possible. Preferably, the sliding support is coated with a low-friction material.

The radius of curvature of the radius of the bridge arc in particular in the course of the conveyor track from the reception until the deformation device is larger than the width of the web, preferably larger than the twofold width of the web, in particular larger than 50 cm or 100 cm. The exact radius of curvature depends on the further conditions of dimensioning of the web of packaging material. The wider the web of packaging material, the larger the radius of curvature of the conveyor track having the form of a bridge arc.

Preferably, the inclination of the bridge arc decreases from the reception until the deformation device, in particular a disposal to the deformation device, preferably constantly sinks, in particular until an apex of the conveyor track. Viewed from the apex, in the conveying direction, the conveyor track sinks towards the deformation device.

In a preferred embodiment of the invention, a tangent direction forms an angle smaller than 20°, 15°, or 10° relative to the vertical direction at the reception of the concavely-planar conveyor track, in particular of the bridge arc. The angle can preferably be larger than 0°, 1°, or 5°.

In a preferred embodiment of the invention, a channel-shaped deformation device connects in particular directly to the conveyor track, as the conveyor track sheet or the conveyor track mesh, wherein the end of the conveyor track lying in the conveying direction continues into a channel bottom of the channel-shaped deformation device. The channel-shaped deformation device has essentially vertical side walls and a cover region, which is provided essentially parallel and congruently to the channel bottom with an identical or similar radius of curvature. The radii of curvature of channel bottom and cover region can be different, as is later illustrated with regard to the channel cross-section.

The channel-shaped deformation device preferably comprises a concavely planar channel bottom surface, which is preferably sheet-shaped. The channel bottom surface has a radius of curvature which corresponds in particular to that of the conveyor track, in particular when the radius of curvature of the conveyor track is constant in the conveying direction.

Additionally or alternatively, a width (in the direction transverse to the conveying direction) of the channel cross-section can decrease in particular continuously along the conveying direction to a disposal opening of the channel-shaped deformation device, in order to form a tapering channel shape. The height of the channel cross-section can increase in particular continuously along the conveying direction from the channel inlet to the channel outlet, which is achieved for example by a reduction of the radius of curvature of the channel cover. The increase of the channel height is distinctly smaller than the decrease of the channel width in the conveying direction.

In a preferred embodiment of the invention, the deformation device has a tapering channel corridor, which comprises a disposal opening, which is formed at the narrowest point of the channel corridor. The tapering channel corridor brings about the deformation of the web of packaging material, which in longitudinal direction following the tapering is compressed in the direction transverse to the conveying direction. The deformation of the web of packaging material is exclusively realized by the channel walls in cooperation with the channel cover and the channel bottom.

The conveyor track is preferably dimensioned such that, after passing the reception, the web of packaging material can bear, along the entire width of the web, in the direction transverse to the conveying direction. For this, the conveyor track preferably has a minimum conveyor track width of at least one width of the web of material, preferably at least 1.5 times the width of the web of material.

In a preferred embodiment of the invention, the disposal direction of the dunnage material leaving the deformation device, defined by the disposal opening of the deformation device, is inclined with respect to the vertical (the direction of gravity) such that the dunnage material which is leaving the deformation device at the disposal opening is oriented downwards with respect to the horizontal, in particular at an angle of inclination of over 20° or 30° with respect to the horizontal. In so doing, the entire conveyor track structure, or at least a major portion of the conveyor track structure, (in the direction of gravity) can lie above the disposal opening, so that in particular in connection to an apex of the conveyor track (in the conveying direction) the packaging material before and on entry into the deformation device is driven in a supporting manner under the influence of the weight force towards the disposal opening. A major portion of the conveyor track means that at least 50% of the conveyor track lies above the disposal opening, wherein it is preferred that approximately the entire conveyor track lies above the disposal opening. In a preferred embodiment of the invention, the reception lies essentially on the same vertical height relative to the disposal opening, wherein the conveyor track or the conveying path of the deformation device to the disposal opening forms an arc-shaped bridge structure between the two ends defined by the reception and the disposal opening. In this way, a slipping back of the web of packaging material in particular out of the deformation device is prevented, when a dunnage material is torn off. The conveying path superstructure, which lies above the disposal opening, provides for stability of the packaging material on the way into the deformation device, in particular during conveying operation and/or when the conveying is at a standstill.

With the invention a reliable and damage-free unfolding of the web of packaging material and an introducing of the unfolded leporello paper web material into the packaging station, namely along the conveyor structure, is achieved, even when untrained operating personnel manipulate the packaging material for example jerkily or too quickly, or operations are carried out constantly with varying traction speeds for example by motor-operated packaging material machines. With the invention in particular in the case of manual and/or motor-operated drawing of the web of packaging material from the leporello folded stack a damage-free feeding in the deformation direction is achieved owing to the conveyor structure.

Furthermore, the conveying resistance of the web of packaging material on feeding in the deformation direction is kept as low as possible, so that the operator must apply as little force as necessary in order to draw the packaging material into the deformation device, to deform and tear off the packaging material.

Further advantageous aspects are indicated in the subclaims.

Figure 2:
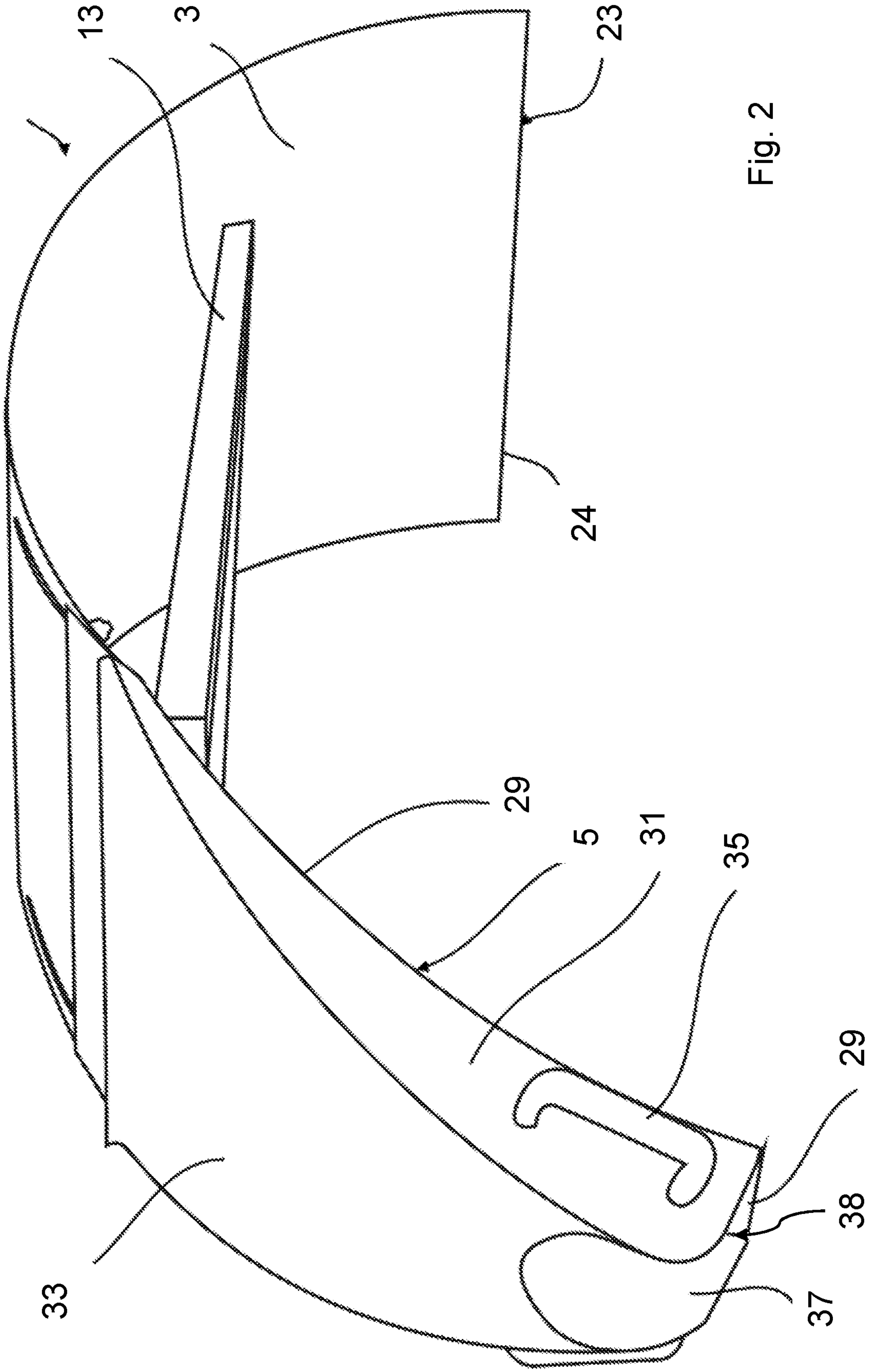
Figure 3:
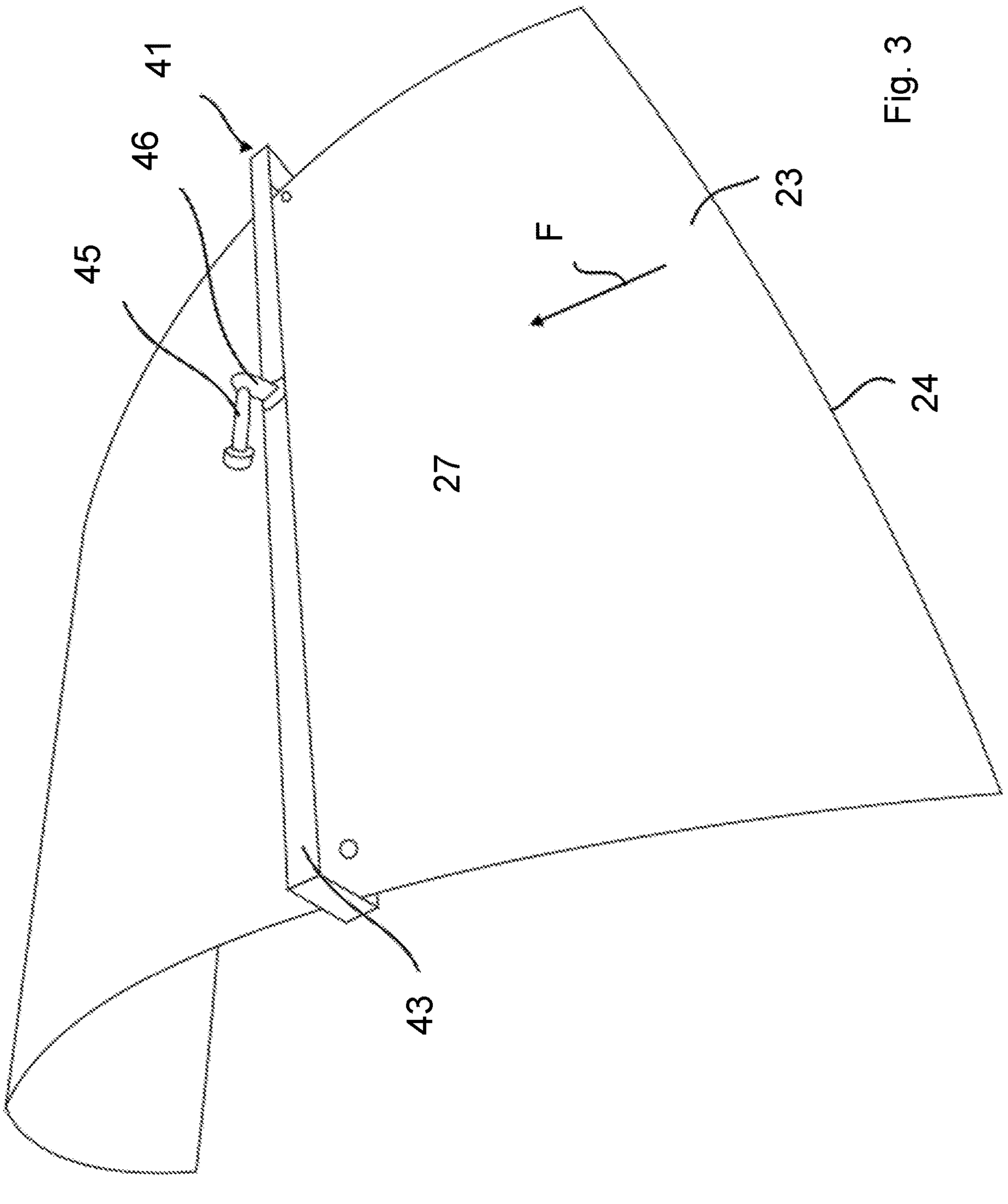
Figure 4:
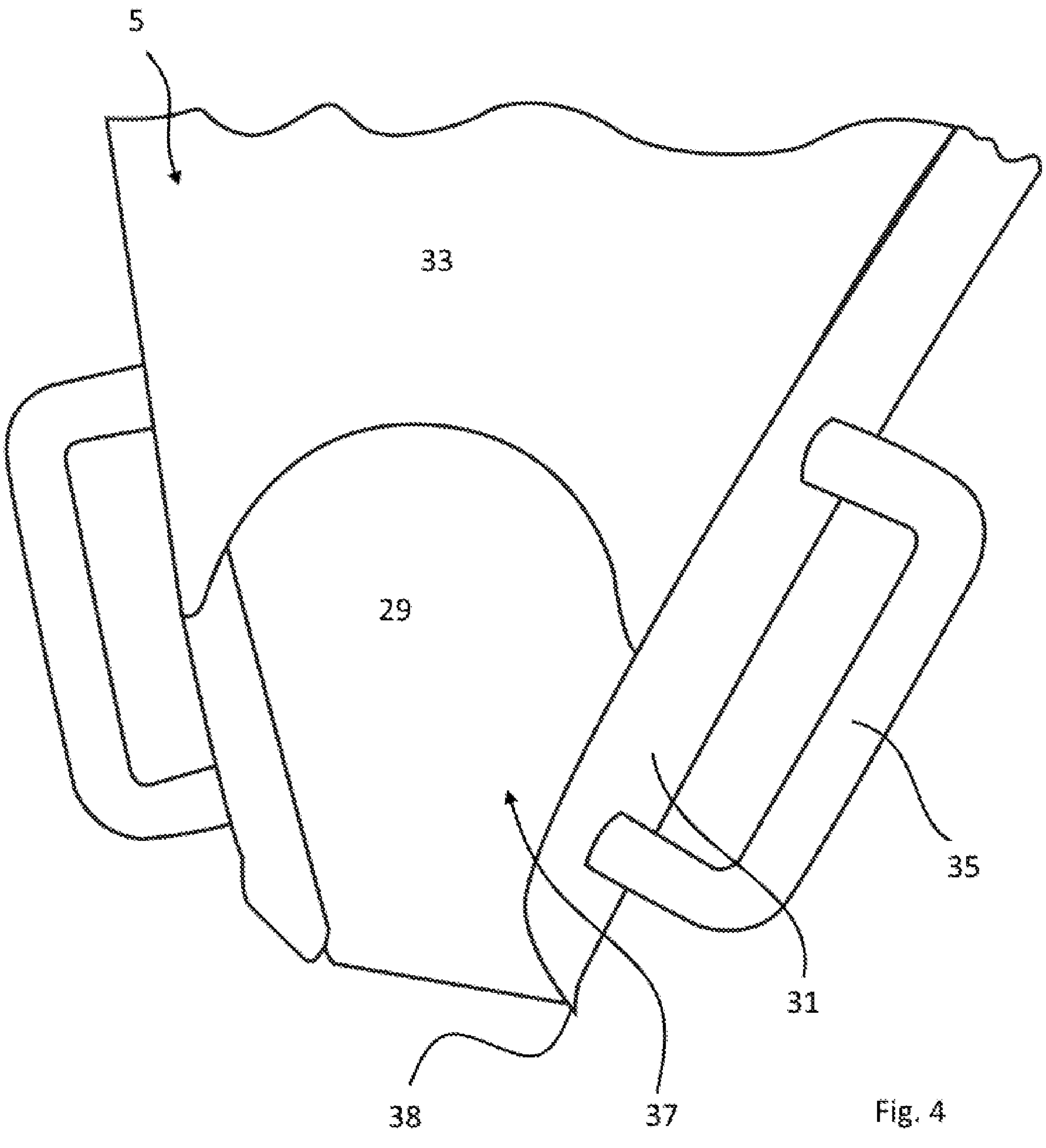

Further advantages, features and characteristics of the invention are explained by the following description of a preferred embodiment with the aid of the attached drawings, in which there are shown:

FIG. 1 a perspective view of a packaging station in accordance with the invention with a web of packaging material supply consisting of a plurality of leporello folded stacks;

FIG. 2 a perspective view of the packaging station in accordance with the invention according to FIG. 1 without the web of packaging material supply;

FIG. 3 a perspective view onto a conveyor structure of the packaging material station in accordance with FIG. 2; and FIG. 4 a perspective detail view of the disposal end of the deformation device in accordance with the packaging station according to FIGS. 1 and 2.

In FIGS. 1 and 2 the packaging station according to the invention is provided in general with the reference number 1 and comprises as main components a conveyor structure 3 according to the invention and a manually operated deformation device 5, free of gears or toothed wheels, which, however, can also be replaced by another deformation device, which can for example also be motorized with a pair of gears.

In FIG. 1 in addition a packaging table 11 is illustrated, on which a supporting structure 13 in the form, for example, of a supporting frame is arranged, on which the conveyor structure 3 and the deformation device 5 is firmly or movably attached (the mounting is not illustrated in further detail). Behind/adjacent to the packaging table 11 a packaging material web supply 15 is positioned, in the form of eight leporello folded stacks which, unused, have a minimum height of 50 cm and are able to be transported together on a pallet, which is not illustrated in further detail. Of the eight leporello folded stacks, one is already partially used.

In accordance with the packaging station 1, which is illustrated in operation, a packaging material web 21 of constant web width b is unfolded from the partially used leporello folded stack and arrives at a reception 23 of the conveyor structure 3.

The height of the reception 23 is set with respect to the upper side of the unused stack such that at least two fold sheets of the leporello folded web 21 are completely unfolded and that a paper web extends, more or less uninfluenced from the leporello fold, before it reaches the conveyor structure 3 at the reception 23. The reception 23 is formed by the edge 24, essentially perpendicular in conveying direction, of the sheet-shaped conveyor structure 3 which, for damage-free receiving, is free of a flange or is in another manner rounded free of edges.

The conveyor structure 3 is a conveyor track 25, which is formed in a sheet form or a mesh structure, which is brought into a bent curvature by cold forming. The sheet-shaped conveyor track which is illustrated in the figures comprises a concavely planar sliding support 27. The sliding support 27 can, as is indicated in FIGS. 1 and 2, have a continuous concave curvature, whereby a uniform conveying, stabilizing the packaging material, is achieved. In an alternative configuration of the sliding support, the latter can also be formed by a plurality of plane, curvature-free sheet sections adjoining one another in series, which lie at an obtuse angle with respect to one another, wherein two adjacent sheet sections form an edge/bend extending in the direction transverse to the conveying direction, whereby a polygon-shaped sliding support (27) is realized, to realize the bridge-shaped curvature. Preferably, the polygon-shaped sliding support (27) has more than five or ten such edges, wherein each sheet section is dimensioned essentially identically, for example has the same width (in conveying direction), which extends along the direction transverse to the conveying direction constantly from one lateral edge of the sliding support to the other lateral edge of the sliding support. The edges/bends (not illustrated in further detail) in particular have the advantage that possible suction forces generated by the conveying, which can arise owing to underpressure phenomena between the packaging material and the sliding support, are dissipated, because the polygonal sliding support enforces a direct (linear) contact with the packaging material.

The unfolded conveying web 21 lies with its entire surface on the sliding support 27 of the conveyor track 25 and is pressed onto the sliding support and drawn along it in particular exclusively under the influence of gravity and by withdrawal forces. In the embodiment illustrated in the figures, the withdrawal forces are achieved manually by drawing by an operator (not illustrated in further detail), who is working at the packaging material table 11. It is to be clear that the drawing forces can also be automated by a motor, which can be part of the deformation device, which, however, is not illustrated in further detail in the figures.

The sheet-shaped conveyor track 25 forms a bridge-shaped arc from the packaging material supply 15, bridging the rear edge of the packaging table 11, up to the deformation device, to which the operator has easy access. Preferably, the radius of curvature of the conveyor track is essentially constant, so that a partially cylindrical track is realized from the reception 21 up to the deformation device 5. At the reception 23, which is realized by the transverse edge 24, perpendicular to the conveying direction F, a track raise is provided, which is specified by an angle from a track tangential direction at the reception 23 with respect to the vertical. This angle is to be larger than 0° and preferably smaller than 10°. In this way, a packaging material web unfolded approximately vertically upwards is reliably received, which owing to the decreasing inclination of the concavely planar conveyor track 25 nestles in a flat manner against the sliding support 27. At higher conveying speeds, an air layer can form between the conveyor track and the packaging material, whereby on the one hand owing to the concavely planar conveyor track a reliable guidance of the packaging material web 21 up to the deformation device 5 arises, on the other hand the packaging material is conveyed gently along the sliding support 27.

The channel-shaped deformation device 5, which is generally formed by a tapering channel structure, immediately adjoins the sheet-shaped conveyor track 25. The channel-shaped deformation device 5 comprises a concavely planar channel bottom 29, which in the course of the radius of curvature corresponds to the sliding support 27 of the conveyor track 25 lying upwards with respect to conveying direction. Lateral channel walls 31 extend from the channel bottom 31, which continue into a channel cover 33, the course of curvature of which corresponds substantially to that of the channel bottom 29.

As can be seen in FIGS. 1 and 2, the channel cross-sectional area decreases continuously in conveying direction, and the channel width (in the direction transverse to the conveying direction) decreases continuously in the conveying direction, whereas the gap height in conveying direction F increases slightly up to the disposal opening 27, so that the web of packaging material can divert in vertical direction during the lateral squeezing. In this way, the desired dunnage form with a sufficiently high dunnage height is achieved. The channel corridor of the deformation device 5 tapers towards the disposal opening 37. The side walls 31 therefore run towards one another in a funnel-shaped manner, so that the web of packaging material, which is drawn through the deformation device 5, can be pressed together owing to the narrowing passage cross-section, whereby a concertina-shaped dunnage material can be created.

At the entry inlet of the deformation channel of the deformation device 5, the cover region is upwardly flanged or bent around, so that a round transverse edge is formed at the inlet region of the deformation channel. As can be seen in FIG. 4, the channel bottom 29, as also the side walls 31, is also bent outwards at the disposal opening 37, so that corresponding bent-around wings and, in particular, one or two tear-off corners 38 are formed. In so doing, a slightest passage cross-section is formed still before the boundary edges of the disposal opening 37.

The disposal opening 37 is widened on the cover side by a recess extending upstream in the conveying direction, so that a manual access by the operator to the packaging material upstream from the winding side of the curvature channel into the disposal opening is facilitated. The disposal opening 37 is configured to be essentially circular on the cover side in the plane of the channel cover 33.

As can be seen in FIGS. 1 and 2, the conveyor track 25 extends essentially along its entire surface above the disposal opening 37. The disposal opening 37 is shaped, dimensioned and oriented manner such that the dunnage material, on leaving the in particular angularly adjustable (not illustrated) deformation device 5, can be directed vertically downward in an angle span of up to 90° (direction of gravity). It is to be clear that the reception 23 can also reach still nearer to the packaging material web supply 15, however the major portion of the conveyor track 35 is to lie above the disposal opening 37.

On the outer side of the side walls 31, handles 35 are able to be grasped for positioning the arrangement of the conveyor structure 3 and the deformation device 5, in particular the disposal opening, over the packaging table 11, in order to bring the unit of conveyor structure 3 and deformation device 5 to the desired packaging site. It is to be clear that a movable mounting in all three dimensions is to realize an adjustment of the disposal opening position.

The disposal opening is realized by the edges, lying downwards with respect to conveying direction, of the channel bottom 29 and the side walls 31 and the channel cover 33, wherein in conveying direction F the side walls 31 and the channel bottom 29 project the furthest. The channel cover 33 is set back with a recess projecting further in contrary to the conveying direction than in the case of the side walls 31 and the channel bottom 29.

In FIG. 3 the conveyor structure 3 is illustrated in a perspective view from the side of the reception 23, wherein the deformation device 5 is not indicated. FIG. 3 shows a retention device 41 arranged above the sliding support 27, which is intended to prevent that on tearing off of the dunnage material 29 downwards, with respect to the conveying direction, of the disposal opening 37 a falling back of the packaging material web contrary to the conveying direction F towards the packaging material web supply 15 is prevented. For this, the holding device 41 has a spanning bracket 43, on which a pressure arm 45, which is spring-preloaded for example, is arranged, which in fact permits a conveying of the conveyor track in conveying direction F in a more or less uninfluenced manner towards the deformation device 5, however prevents a slipping back of the packaging material web 21. Therefore, the pressure arm is prestressed towards the sliding support 27 and extends from a fastening arm 46 pivotably in conveying direction F.

For loading the packaging station 1, the operator goes to the packaging material web supply 15 and grasps the free end of the packaging material web 21 and directs it towards the conveyor structure 3 along the sliding support into the deformation device 5. Finally, the packaging material web 21 is forced through the disposal opening 37, whereby the packaging material web 21 deforms into the desired dunnage material 39. At the disposal opening 37 a tear-off cutting edge can be arranged, in order to accomplish the simple tearing off of the formed dunnage material 39. The tear-off process is further simplified because on the channel bottom 29 and the channel walls 31 in conveying direction at the height of the disposal opening 37 an essentially triangular notch/depression (38) is realized, delimited by an edge section of the respective side wall 31 and the channel bottom 29. These edge sections (tear-off edges) are, in particular, sharpened. Owing to the inwardly projecting tear-off edges, a risk of injury to the operator is reduced in so far as the notch (38) is relatively small and the edge sections, owing to their rear projection are protected by the protruding sections of the channel bottom 29 and of the side walls 31.

After tearing off, in particular at the triangular tear-off corner 38, the end of the deformed packaging material web remains jammed in the corner region, so that a falling back of the packaging material web towards the packaging material web supply 15 is prevented.

At the start of the next dunnage material production, the operator grasps the tear-off end of the dunnage material 39 which is clamped at the tear-off corner 38, and draws on it to generate further dunnage material 39. The packaging material web 21, owing to the traction force in conveying direction F and the curvature inclination of the conveyor track 25 is pressed gently against the sliding support 27, which introduces the packaging material web in a steadying manner into a predefined conveyor track path into the deformation device 5.

It was found that even at high speeds a reliable feeding and deforming of the packaging material web is successful.

The features disclosed in the above description, the figures and claims can be of significance both individually and also in any desired combination for the realization of the invention, in the various embodiments.

LIST OF REFERENCE NUMBERS

1 packaging station
3 conveyor structure
5 deformation device
11 packaging table
13 supporting structure
15 supply of packaging material web
17 leporello folded stack
21 web of packaging material
23 reception
24 transverse edge
25 conveyor track
27 sliding support
29 channel bottom
31 channel walls
33 channel cover
35 handles
37 disposal opening
38 tear-off corner
39 dunnage material
41 retention device
43 spanning bracket
45 pressure arm
46 fastening arm
b web width
F conveying direction

The invention claimed is:

1. A packaging station comprising:

a deformation device configured to convert a web of packaging material drawn from a supply of packaging web into a dunnage material, the deformation device being channel-shaped having a concavely planar channel bottom surface; and a conveyor structure configured to: receive the drawn web of packaging material, and feed the drawn web of packaging material into the deformation device, wherein the conveyor structure includes a conveyor track having a surface extending from a reception of the conveyor structure to an entrance of the deformation device in a conveying direction, the conveyor track being configured such that after passing the reception, the web of packaging material travels over the surface in the conveying direction, wherein the deformation device adjoins the conveyor structure such that the surface of the conveyor track and the channel bottom surface of the deformation device collectively form an arc-shaped structure having a uniform radius of curvature from the reception of the conveyor structure to a disposal opening of the deformation device in the conveying direction.

2. The packaging station according to claim 1, wherein the conveyor structure comprises a plane sliding support that is formed by a sheet or a mesh and facing the web of packaging material, wherein the reception of the conveyor track is formed by a rectilinear edge extending essentially perpendicular with respect to the conveying direction.

3. The packaging station according to claim 1, wherein the conveyor structure comprises a plane sliding support having a sliding support length.

4. The packaging station according to claim 1, wherein the conveyor track comprises a bridge arc connecting the supply of packaging material web with the deformation device, wherein an inclination of the bridge arc decreases from the reception to an apex of the conveyor track, and, starting from the apex of the conveyor track, the conveyor track descends towards the deformation device.

5. The packaging station according to claim 4, wherein a tangent direction forms an angle of reception smaller than 20° and larger than 0°, relative to a vertical direction at the reception of the sliding support of the bridge arc, wherein a tangent direction forms an angle of disposal smaller than 20° and larger than 0° relative to the vertical direction at the disposal opening of the sliding support of the bridge arc.

6. The packaging station according to claim 1, wherein:

the deformation device comprises a channel-shaped deformation device that connects to the conveyor track, wherein the channel-shaped deformation device comprises the concavely planar channel bottom surface, the radius of curvature of which corresponds to the radius of curvature of the conveyor track to provide the uniform radius of curvature of the arc-shaped structure;

a width transverse to the conveying direction of a channel cross section, at the channel bottom surface, continuously decreases from the entrance of the deformation device to the disposal opening of the deformation device in the conveying direction; and a height of the channel cross section continuously increases from the entrance of the deformation device to the disposal opening in the conveying direction.

7. The packaging station according to claim 1, wherein the deformation device comprises a tapering channel corridor opening into the disposal opening, wherein within the channel corridor, a deformation of the web of packaging material is realized by walls of the channel.

8. The packaging station according to claim 1, wherein the conveyor track is dimensioned such that, after passing the reception, the web of packaging material can bear its entire surface, along an entire width of the web in the direction transverse to the conveying direction, on the conveyor structure.

9. The packaging station according to claim 1, wherein the deformation device is oriented relative to a vertical direction in a fixed manner with an inclination angle, such that the dunnage material leaving the deformation device is oriented vertically downward at the disposal opening, wherein an apex of the conveyor structure is positioned in a direction of gravity above the disposal opening, the reception of the conveyor structure being arranged essentially on a same height as the disposal opening.

10. The packaging station according to claim 1, wherein the conveyor track comprises a bridge arc connecting the supply of packaging material web with the deformation device.

11. The packaging station according to claim 1, wherein the conveyor track comprises a bridge arc connecting the supply of packaging material web with the deformation device.

12. The packaging station according to claim 1, wherein the channel bottom has a radius of curvature that corresponds to a radius of curvature of the conveyor track to provide the uniform radius of curvature of the arc-shaped structure.

13. A packaging station comprising:

a deformation device configured to convert a web of packaging material drawn from a supply of packaging web into a dunnage material, the deformation device being channel-shaped having a concavely planar channel bottom surface; and a conveyor structure configured to: receive the drawn web of packaging material, and feed the drawn web of packaging material into the deformation device, wherein the conveyor structure comprises: a conveyor track comprising a plane sliding support having a surface extending from a reception of the conveyor structure to an entrance of the deformation device in a conveying direction, the conveyor track being configured so that after passing the reception, the web of packaging material travels over the surface in the conveying direction and the conveyor track comprises a bridge arc connecting the supply of packaging material web with the deformation device, wherein:

the deformation device adjoins the conveyor track such that the surface of the conveyor track and the channel bottom collectively form an arc-shaped structure having a uniform radius of curvature from the reception of the conveyor structure to a disposal opening of the deformation device in the conveying direction, the arc-shaped structure including the bridge arc of the conveyor track, and an inclination of the bridge arc is configured to decrease from the reception to an apex of the conveyor track, and starting from the apex of the conveyor track, the conveyor track is configured to descend towards the deformation device.

14. The packaging station according to claim 13, wherein the plane sliding support is formed by a sheet or a mesh and facing the web of packaging material, wherein the reception of the conveyor track is formed by a rectilinear edge extending essentially perpendicular with respect to the conveying direction.

15. The packaging station according to claim 13, wherein the plane sliding support of the conveyor track comprises a sliding support length.

16. A packaging station comprising:

a deformation device including a deformation channel and being configured to convert a web of packaging material drawn from a supply of packaging web into a dunnage material; and a conveyor structure configured to: receive the drawn web of packaging material, and feed the drawn web of packaging material into the deformation device, wherein the conveyor structure includes a conveyor track configured to descend towards the deformation device, the conveyor track including: a plane sliding support having a surface extending from a reception of the conveyor structure to an entrance of the deformation device, the conveyor track being configured such that after passing the reception, the web of packaging material travels over the surface of the plane sliding support in a conveying direction, the plane sliding support forming a bridge arc connecting the supply of packaging material web with the deformation device, an inclination of the bridge arc being configured to decrease from the reception until an apex of the conveyor track in the conveying direction, wherein a width of a base of the deformation channel transverse to the conveying direction of the deformation channel continuously decreases in the conveying direction from the entrance of the deformation channel to a disposal opening of the deformation channel and a height of the deformation channel between the base of the deformation channel and a channel cover continuously increases in the conveying direction from the entrance of the deformation channel to the disposal opening of the deformation channel.

17. The packaging station according to claim 16, wherein the deformation device and the conveyor track collectively form an arc-shaped structure having a uniform radius of curvature from the reception of the conveyor structure to the disposal opening of the deformation device in the conveying direction.

* * * * *